United States Patent [19]
Sezan et al.

[11] Patent Number: 5,600,731
[45] Date of Patent: Feb. 4, 1997

[54] METHOD FOR TEMPORALLY ADAPTIVE FILTERING OF FRAMES OF A NOISY IMAGE SEQUENCE USING MOTION ESTIMATION

[75] Inventors: Muhammed I. Sezan; Mehmet K. Ozkan; Sergei V. Fogel, all of Rochester, N.Y.

[73] Assignee: Eastman Kodak Company, Rochester, N.Y.

[21] Appl. No.: 697,868

[22] Filed: May 9, 1991

[51] Int. Cl.⁶ .................................................. G06K 9/40
[52] U.S. Cl. ........................ 382/107; 382/261; 348/620
[58] Field of Search ............................. 358/105; 382/54, 382/107, 260, 261, 275, 254; 348/155, 618, 620

[56] References Cited

U.S. PATENT DOCUMENTS

| | | | |
|---|---|---|---|
| 4,383,272 | 5/1983 | Netravali et al. | 358/105 |
| 4,482,970 | 11/1984 | Barry | 358/105 |
| 4,668,986 | 5/1987 | Furukawa | 358/105 |
| 4,745,458 | 5/1988 | Hirano et al. | 358/105 |
| 4,760,445 | 7/1988 | Mijiyawa | 358/105 |
| 4,807,034 | 2/1989 | Takeuchi et al. | 358/105 |
| 4,864,393 | 9/1989 | Harradine | 358/105 |
| 4,890,160 | 12/1989 | Thomas | 358/105 |
| 4,937,667 | 6/1990 | Choquet et al. | 358/105 |
| 4,989,087 | 1/1991 | Pele et al. | 358/105 |
| 5,019,903 | 5/1991 | Dougall et al. | 358/105 |

Primary Examiner—Leo Boudreau
Assistant Examiner—Andrew W. Johns
Attorney, Agent, or Firm—Peyton C. Watkins

[57] ABSTRACT

A method of temporally adaptive filtering of the frames of an image sequence is disclosed. To filter the kth frame, first, the motion trajectories that transverse the pixel locations at the kth frame are determined using a motion estimation algorithm. Motion trajectories pass through a predetermined number of frames neighboring the kth frame. Image values at the neighboring frames, along motion trajectories are then evaluated. Temporally adaptive linear minimum mean square error (LMMSE) estimates of the image values at the pixel locations of the kth frame are determined using the image values along the motion trajectories. These steps are repeated for each of the other frames of the image sequence.

18 Claims, 6 Drawing Sheets

METHOD FOR TEMPORALLY ADAPTIVE FILTERING OF FRAMES OF A NOISY IMAGE SEQUENCE USING MOTION ESTIMATION

FIELD OF THE INVENTION

The present invention relates to noise reduction in digital image sequences that can be obtained from various video sources as well as motion picture film.

BACKGROUND OF THE INVENTION

Motion estimation, being important in its own right in the broad area of computer vision, is of utmost importance in almost every aspect of image sequence processing. Interframe motion information allows the development of algorithms that take advantage of naturally existing redundancies among the frames of an image sequence. The difficulties inherent to the motion estimation problem, and developing novel strategies for utilizing the interframe motion information in the context of various processing tasks, pose challenges in the field of image sequence processing.

Image sequence processing is concerned with problems such as interframe motion estimation, temporal frame interpolation, noise filtering, restoration and data compression. The present invention is concerned with two of these problems in particular: motion estimation and noise filtering.

The importance of reducing the noise in image sequences is growing with the increasing use of video and television systems in numerous scientific, commercial and consumer-oriented applications. A human observer can potentially obtain more information from an image sequence when the noise is reduced. In cases where the noise is not visually perceivable, reduction of noise increases the efficiency of subsequent processing that may be applied to the image sequence, such as data compression.

There are two major temporal-domain approaches to image sequence filtering: (1) the motion-compensation approach, and (2) the motion-detection approach. In motion-compensated filtering, first a motion estimation algorithm is applied to the noisy image sequence to estimate the motion trajectories, i.e., locations of pixels (or subpixels) that correspond to each other at a predetermined number of contiguous image frames. Then, the value of a particular pixel at a certain frame is estimated using the image sequence values that are on the motion trajectory passing through that pixel. The estimation is performed using either an infinite impulse response (IIR) or a finite impulse response (FIR) filter structure.

In contrast, methods based on motion detection do not attempt to estimate the interframe motion. Instead, direct differences of pixel values at identical spatial locations of two adjacent frames are computed to detect the presence of interframe motion. An estimate of the pixel value at a certain location of the present frame is determined by applying an FIR or an IIR filter structure to pixels at identical spatial locations of a predetermined number of past and/or future frames. The filter coefficients are functions of the "motion-detection signal" which is defined as the difference between the pixel value of interest at the present frame and the pixel value at the same location of the previous frame. Certain IIR filter structures for temporal filtering on the basis of motion detection have been proposed in the prior art, as well as a variety of other motion-detection based filtering methods.

Generally speaking, the performance of these two approaches is determined by the filter structure, dependence of the filter structure to the motion-detection signal (in case of the motion-detection approach), and the performance of the motion estimation algorithm (in case of the motion-compensation approach). Motion-compensated filtering methods tend to be more complex due to interframe motion estimation. On the other hand, they are potentially more effective than those based on motion detection because they make use of the interframe motion information. In practice, however, the success of a motion-compensated method is strongly dependent on the success of motion estimation.

In an ideal setting, where the scene contents remain unchanged from one frame to another and the motion estimation algorithm is not affected by noise, direct averaging of image values over motion trajectories provides effective noise reduction. In fact, under independent white Gaussian noise assumption, the average is a maximum likelihood estimate of the pixel value. In practice, however, scene contents change from one frame to another, e.g., due to camera panning and existence of covered/uncovered regions. As a result, image values over an estimated motion trajectory may not necessarily correspond to the same image structure and direct averaging may result in oversmoothing of image details. Therefore, the noise filtering algorithm should be temporally adaptive. In one extreme, when the motion estimation is accurate, it should approach direct averaging. In the other extreme, when the motion estimation is inaccurate, it should not perform any filtering. Indeed, the motion estimation method should be able to provide good estimates in the presence of noise as well as in the case of varying scenes in order to allow for effective noise reduction.

The adaptivity requirement outlined above is satisfied when the local linear minimum mean square error ("LMMSE") point estimator that has been derived by Kuan, et al. and by Lee is applied in the temporal direction along the motion trajectories (See: D. T. Kuan et al., "Adaptive Noise Smoothing Filter for Images with Signal-Dependent Noise", IEEE Trans. Pattern Anal. Machine Intell., PAMI-7, pp. 165–177, March 1985; and Lee, "Digital Image Enhancement and Noise Filtering by Use of Local Statistics", IEEE Trans Pattern Anal Machine Intell., PAMI-2, pp. 165–168, March 1980.)

It was suggested by Martinez et al. ("Implicit Motion Compensated Noise Reduction of Motion Video Scenes", Proc. ICASSP, pp. 375–378, Tampa, Fla. 1985) to apply the adaptive LMMSE point estimator in the temporal direction. Due to the lack of motion estimators that are robust in the presence of noise, however, Martinez et al. used a cascade of five LMMSE estimators over a set of five hypothesized motion trajectories for each pixel, without estimating the actual motion. This approach can be regarded as a motion-detection approach rather than a motion-compensated approach since interframe motion is not estimated. Motion detection along a hypothesized trajectory is implicit in the adaptive nature of the estimator. Due to the adaptive nature of the estimator, filtering is effective only along the trajectory that is close to the actual one. This approach has been reported to be successful in cases where the hypothesized motion trajectories are close to the actual ones.

SUMMARY OF THE INVENTION

There is a need for a method of reducing noise in image sequences that uses the local LMMSE point estimator over motion trajectories that are explicitly estimated using a robust motion estimation algorithm.

This and other objects are achieved by the present invention which provides a method of temporally adaptive filtering of the frames of an image sequence. To filter the kth frame, first, the motion trajectories that pass through the pixel locations at the kth frame are determined using a motion estimation algorithm. Motion trajectories pass through a predetermined number of frames neighboring the kth frame clarifying definition of motion trajectory. The motion trajectory passing through a pixel location in the kth fame is defined as the set of spatial locations in the neighboring frames that correspond to that pixel in the sense of motion. To determine the motion trajectory passing through a certain pixel location, one should estimate the displacement of the image value at that pixel location in the neighboring frames using a motion estimation algorithm. The displaced locations in the neighboring frames from the motion trajectory. Temporally adaptive linear minimum mean square error (LMMSE) estimates of the image values at the pixel locations of the kth frame are determined using the image values along the motion trajectories. Since displacements can in general be at subpixel levels, a motion trajectory may pass through subpixel locations in the frames neighboring the kth frame. Therefore, image values should be determined at subpixel locations prior to filtering. Image values at subpixel locations are determined using one of the well-known spatial interpolation techniques, such as bilinear interpolation. These steps are repeated for each of the other frames of the image sequence.

A specific motion estimation algorithm that can be used in the present invention is the subject of a pending patent application, Ser. No. 275,859 filed on Nov. 25, 1988, and herein expressly incorporated by reference, and was invented by one of the inventors of the present invention. This motion estimation algorithm, hereinafter the "Fogel algorithm", is very well suited for filtering noisy image sequences because (i) it is extremely insensitive to noise, and (ii) it provides good estimates in the case of varying scene content. Its robustness is due to the fact that it avoids direct differentiation of the image distribution. It imposes the optical flow and directional smoothness constraints adaptively using a novel variational principle. This latter feature of the Fogel algorithm is responsible for its good performance in the case of covered/uncovered region and camera panning situations.

The method of the present invention performs temporally adaptive LMMSE filtering along motion trajectories which are determined using a robust motion estimation algorithm. The noise is assumed to be white. However, it may be signal-independent or signal-dependent. The method of the present invention is superior to an implicit motion-detection method as well as other motion-compensated methods using pel-recursive motion estimation. Also, the method of the present invention is very effective in suppressing the film-grain noise, without smearing the image details, for image sequences digitized from motion picture film.

Other objects, advantages and novel features of the present invention will become apparent from the following detailed description of the invention when considered in conjunction with the accompanying drawings.

DETAILED DESCRIPTION OF PREFERRED EMBODIMENTS

The present invention provides an algorithm for temporal filtering of noisy image sequences, which utilizes the estimate of the interframe motion. This motion-compensated temporal filtering approach makes use of interframe motion information. A motion estimation algorithm that has been adapted for use as the algorithm of the present invention is the Fogel algorithm, although other robust algorithms may be developed that would also be suitable. The Fogel algorithm is very well suited for noise filtering applications due to its robust nature. The basic mathematical principles of the Fogel algorithm is described in S. V. Fogel, 'Estimation of velocity vector fields from time-varying image sequences,' CVGIP: Image Understanding, Vol. 53, No. 3, May, 1991. For the purposes of the present discussion, the basic principles of the Fogel algorithm are presented, rather than its mathematical details.

In the present invention, a noisy image sequence, g(x,y,t), is modeled by:

$$g(x,y,t)=f(x,y,t)+v(x,y,t) \qquad \text{Eq. (1)}$$

where f(x,y,t) and v(x,y,t) denote the actual image and noise distributions, respectively, at continuous spatial and temporal coordinates (x,y,t). A discrete model can be defined in terms of the discrete coordinates (m,n,k) as g(m,n,k)=f(m,n,k)+v(m,n,k), where g(m,n,k), f(m,n,k), v(m,n,k) denote the sampled versions of the corresponding quantities in Eq.(1).

Assume that the frame at time k of a given image sequence is filtered using its N neighboring frames including itself. Without loss of generality, also assume that N=2M+1 and that the frames at times k−M, ... k−1, k, k+1 ..., k+M are used to filter the frame at time k. (See FIG. 1 for an illustration of the frames for k=0 and M=2.)

Figure 1:
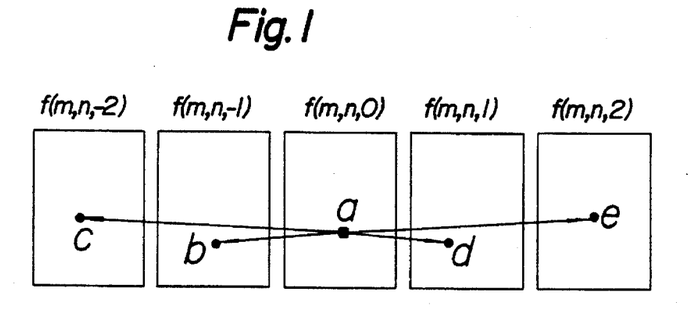
FIG. 1 shows a sequence of image frames to illustrate a first embodiment of the method of the present invention.

In the first step of the present invention, motion trajectories that pass through the pixel locations at the kth frame are determined using the motion estimation algorithm. A motion trajectory is defined for each pixel in the kth frame. For a pixel located at (m,n) in the kth frame, the motion trajectory $\tau_{m,n,k}$ is defined as the set of locations containing (m,n) as well as the displaced locations corresponding to (m,n) in the N−1 neighboring frames at times k−M, ... k−1, k+1, ..., k+M. The displacement vectors are estimated by the motion estimation algorithm FIG. 1 shows the pixel located at (m,n)=a at frame k=0, and the corresponding (in the motion sense) locations b,c,d, and e in the neighboring four frames. In this case, the motion trajectory is the set $\tau_{a,0}$={a,b,c,d,e}. In general, the components of the displacement vector estimates are real-valued, and thus the trajectories often include subpixel locations at which the image values are determined via interpolation.

At the second step of the method of the present invention, image values that lie along the motion trajectories are used to determine the temporally adaptive LMMSE estimates (i.e., filtered values) of pixel values at the kth frame. This two-step procedure is then repeated for the other frames of the sequence.

In the following, the motion estimation step is discussed first in more detail, followed by a discussion of temporally adaptive filtering.

Motion estimation algorithms can be classified into three major classes: (i) feature/region matching methods; (ii) Fourier transform domain methods; and (iii) spatiotemporal-gradient based methods. In the feature/region matching methods, motion is estimated by matching features (e.g., edges) or regions (e.g., block of pixels) from one frame to another. The displacement vectors are estimated only on a sparse set of image points. The Fourier transform methods exploit the relationship between the Fourier transforms of two-dimensional signals shifted with respect to each other. The spatiotemporal-gradient based methods estimate the motion by using spatial and temporal changes (gradients) of the image distribution as well as the displacement vector field. The Fogel algorithm, used in certain embodiments of the present invention as the motion estimation algorithm, is a spatiotemporal gradient method.

There are four major ideas of the Fogel algorithm: (1) formation of a multiresolution representation of the given image sequence, (2) the use of optical flow and directional smoothness constraints on the displacement vector field estimate, (3) statement of a novel variational principle used to obtain the displacement vector field estimate, and (4) solution of the variational principle. For the sake of discussion, the emphasis is on the concepts of the Fogel algorithm rather than its mathematical details. Further, for the sake of simplicity, a different notation is used than that contained in the Technical Report mentioned earlier. Also, the following discussion is limited to continuous spatial and temporal variables.

A multiresolution representation of the given image sequence, denoted by $g^\alpha(x,y,t)$, is determined by correlating it with a kernel of the form Eq. (2)

$$h(x,y) = \begin{cases} A\exp\left\{ \dfrac{-(C^2x^2 + D^2y^2)}{B^2 - (C^2x^2 + D^2y^2)} \right\}, & C^2x^2 + D^2y^2 < B^2 \\ 0, & \text{otherwise.} \end{cases}$$

That is $g^\alpha(x,y,t) \doteq \int_\Omega g(\mu,\eta,t) h((\mu-x)/\alpha, (\eta-y)/\alpha) d\mu d\eta$. Here, $\Omega$ denotes the image support, A,B,C and D are predetermined constants, and $\alpha$ is the resolution parameter. One can see that the spatial resolution of $g^\alpha(x,y,t)$ decreases as $\alpha$ increases. It is important to note that the spatial partial derivatives of $g^\alpha$ can be computed conveniently by correlating g with the partial derivatives of the correlation kernel which is infinitely differentiable. Motion estimation is performed hierarchically, starting from the lowest resolution and ending at the original resolution of the image sequence.

The Fogel algorithm imposes optical flow and directional smoothness constraints on the displacement vector field estimate. These two constraints are introduced in the following. The estimate of the displacement vector field at location r, describing the motion between frames at t and $t+\Delta t$, at the resolution level $\alpha$, is denoted as $$\hat{d}^\alpha(r;t,\Delta t) = [\hat{d}_x^\alpha(r;t,\Delta t)\ \hat{d}_y^\alpha(r;t,\Delta t)]^T \qquad \text{Eq. (3)}$$

(3)
where $r \doteq [x\ y]^T$. Then, the displaced frame difference function, $\phi^\alpha$, for these two frames, at the resolution level $\alpha$, is defined as $$\phi^\alpha(r,\hat{d}^\alpha) \doteq g^\alpha(r+\hat{d}^\alpha(r;t,\Delta t), t+\Delta t) - g^\alpha(r,t). \qquad \text{Eq. (4)}$$

The displaced frame difference function can be used to introduce the optical flow constraint. The effects of noise, possible changes in the scene illumination, etc., are ignored for the moment and the points of a moving structure are assumed to attain the same gray level at adjacent frames. In that case, if the estimate $\hat{d}^\alpha$ were equal to the true displacement vector, the displaced frame difference function would attain the value of zero at that location. The optical flow constraint is said to be satisfied by the displacement vector when the displaced frame difference function attains the value of zero. Hence, optical flow constraint is imposed as the (absolute) value of the displaced frame function is decreased.

It is important to note that the optical flow constraint is not sufficient to uniquely determine the displacement vector. In other words, the equation $\phi^\alpha(r,\hat{d}^\alpha)=0$ has, in general, more than one solution. In particular, the optical flow constraint imposes a restriction only on the component of the displacement vector that is in the direction of the spatial gradient vector at location r. There are no restrictions imposed, however, on the component in the direction perpendicular to the gradient vector. The solution space for the displacement vector estimate, therefore, contains more than one element.

The size of the solution for the displacement vector estimate can be reduced by using the multispectral characteristics of the image, if available. For instance, if the image sequence is available in color, optical flow constraint can be imposed in red, green and blue channels. Since the direction of the spatial gradient vector at each color channel is different in general, the displacement vector is effectively constrained in three different directions. This can be viewed as increasing the number of "knowns" while the number of unknowns remains the same.

The solution space for the displacement vector estimate can be further reduced by using additional constraints, such as the smoothness constraint which imposes the requirement that the displacement vectors vary smoothly along certain spatial directions. In the following, the directional smoothness function $\xi^\alpha$ at resolution level $\alpha$ is defined to introduce the directional smoothness constraint.

The directional smoothness function is defined in terms of the directional derivatives of the displacement vector. The directional derivatives of the x and y components of the displacement vector in the direction of the vector $s=[s_x,s_y]^T$ are defined as Eq. (5)

$$\nabla_s \hat{d}_x^\alpha(r) \doteq \dfrac{\partial}{\partial a} \hat{d}_x^\alpha(x+as_x, y+as_y)\bigg|_{a=0}$$

$$\nabla_s \hat{d}_y^\alpha(r) \doteq \dfrac{\partial}{\partial a} \hat{d}_y^\alpha(x+as_x, y+as_y)\bigg|_{a=0}.$$

The directional smoothness function is defined by $$\xi^\alpha(r,\hat{d}^\alpha,s) \doteq [(\nabla_s \hat{d}_x^\alpha(r))^2 + (\nabla_s \hat{d}_y^\alpha(r))^2]^{1/2} \qquad \text{Eq. (6)}$$

Smoothness constraint in the direction of s is imposed when the value of this function is small.

It is important to realize that optical flow and smoothness constraints on the displacement vector field are not necessarily valid at all image points. For instance, optical flow constraint does not hold near occlusion boundaries where regions are covered or uncovered. Smoothness constraint, on the other hand, does not hold near occlusion boundaries in the direction perpendicular to occlusion boundaries, where the displacement field suddenly changes.

Early spatiotemporal methods in the prior art used the optical flow and smoothness constraints globally on the entire image, resulting in algorithms that provided unsatisfactory displacement estimates in general. Later methods selectively impose the smoothness constraint. These methods required the detection of object boundaries. The smoothness constraint was then imposed only along the boundaries but not perpendicular to the boundaries (without differentiating between the occlusion and non-occlusion boundaries; smoothness constraint does hold in the direction perpendicular to a non-occlusion boundary). The Fogel algorithm has the novel ability to impose both the optical flow and directional smoothness constraints adaptively in an appropriate fashion (differentiating between occlusion and non-occlusion boundaries) within the framework of a new variational principle, as is explained below.

In order to appropriately impose the optical flow and directional smoothness constraints, one should minimize a weighted sum (or integral) of the displaced frame difference and directional smoothness functions defined above, where the weights are adjusted with respect to the validity of each constraint. The weight of the displaced frame difference function should be decreased at points where optical flow constraint is violated. Similarly, the weight of the directional smoothness function should be decreased in directions where the smoothness constraint is violated. Ideally, these weights should be functions of the displacement vector field since the displacement vector field is the best indicator for the validity of these constraints. For instance, a sudden change in the spatial gradient of the displacement vector signals the presence of an occlusion boundary. (This is explained in greater detail below when the explicit forms of these weights are discussed). With this in mind, the displacement field estimate should satisfy the following variational principle: the estimate $\hat{d}^\alpha$, at resolution level $\alpha$, should be such that the functional $$J(\hat{d}^\alpha, \delta\hat{d}^\alpha) \doteq \int_\Omega c_1(r,\hat{d}^\alpha)(\phi^\alpha(r,\hat{d}^\alpha+\delta\hat{d}^\alpha))^2 dr + \int_\Omega [\int_S c_2(r,\hat{d}^\alpha,s)(\epsilon^\alpha(r,\hat{d}^\alpha+\epsilon\hat{d}^\alpha,s))^2 ds] dr \quad \text{Eq. (7)}$$

is minimized with respect to $\delta\hat{d}^\alpha$ when $\epsilon\hat{d}^\alpha$0. The first term on the right hand side of Eq.(7) is a weighted integration of the square of the displaced frame difference function over the entire image. In the second term, the notation $\int_S (.) ds$ denotes the integration over a predetermined set, S, of directions (in the preferred embodiment of the algorithm, eight directions are considered); the weighted integral of the smoothness function is then integrated over the entire image.

The weights, which depend on the displacement vector estimate, are given by Eq. (8)

$$c_1(r,\hat{d}^\alpha) = \frac{1}{u^2 + p^2(\phi^\alpha(r,\hat{d}^\alpha))^2 + q^2(\|\nabla\hat{d}_x^\alpha(r)\|^2 + \|\nabla\hat{d}_y^\alpha(r)\|^2)(\phi^\alpha(r,\hat{d}^\alpha))^2}$$

where $$\nabla\hat{d}_x^\alpha(r) \doteq \left[\frac{\partial\hat{d}_x^\alpha(r)}{\partial x} \quad \frac{\partial\hat{d}_x^\alpha(r)}{\partial y} \quad T\right]$$

and $$\nabla\hat{d}_y^\alpha(r) \doteq \left[\frac{\partial\hat{d}_x^\alpha(r)}{\partial x} \quad \frac{\partial\hat{d}_y^\alpha(r)}{\partial y} \quad T\right]$$

denote the spatial gradients of the displacement vector, and Eq. (9)

$$c_2(r,\hat{d}^\alpha,s) = \frac{1}{v^2 + w^2(\xi^\alpha(r,\hat{d}^\alpha,s))^2 + z^2(\nabla_s g^\alpha(r))^2(\xi^\alpha(r,\hat{d}^\alpha,s))^2},$$

where $\nabla_s$ is the directional derivative operator defined in Eq.(5). The parameters p,q,u,v,w,z are heuristically determined using a number of image sequences. Their values are robust in general and do not need to be adjusted from one image sequence to another.

The following is a discussion of adaptive weighting of optical flow and directional smoothness constraints. The weight function $c_1(r,\hat{d}^\alpha)$ associated with the displaced frame difference function will be considered first. At any location r, the value of the weight function should be monotonically decreasing with increasing values of the displaced frame difference function, hence weakening the effect of the optical flow constraint (at location r) on the solution of Eq.(7). This explains the presence of the term $p^2(\phi^\alpha(r,\hat{d}^\alpha))^2$ in the denominator of the weight function given in Eq.(8). The inclusion of the term $q^2(|\nabla\hat{d}_x^\alpha(r)|^2+|\nabla\hat{d}_y^\alpha(r)|^2)(\phi^\alpha(r,\hat{d}^\alpha))^2$ in the denominator of Eq.(8) is primarily motivated by the fact that the weakening of the optical flow constraint should be the most significant near occlusion boundaries. Near occlusion boundaries, both the gradient term $G(r,\hat{d}^\alpha) \doteq (|\nabla\hat{d}_x^\alpha(r)|^2+|\nabla\hat{d}_y^\alpha(r)|^2)$ and the displaced frame difference function $\phi^\alpha(r,\hat{d}^\alpha)$ attain high values due to sudden change in the displacement vector field and due to covering/uncovering image structures, respectively. Hence, the compounding effect of the product of these two quantities significantly reduces the weight, resulting in significant weakening of the optical flow constraint. As a consequence, the weakening of the optical flow constraint due to occlusion is more severe than that due to intraframe differences created by noise and/or isolated artifacts (e.g., scratches on the film from which the image sequence is digitized).

The purpose of the parameters p and q is to adjust the relative effects of the terms $G(r,\hat{d}^\alpha)$ $(\phi^\alpha(r,\hat{d}^\alpha))^2$ and $(\phi^\alpha(r,\hat{d}^\alpha))^2$ on the value of the weight function. The parameter u determines the value of the weight function when the other two terms in the denominator attain small values, especially when the optical flow constraint is strongly imposed.

Figure 3:
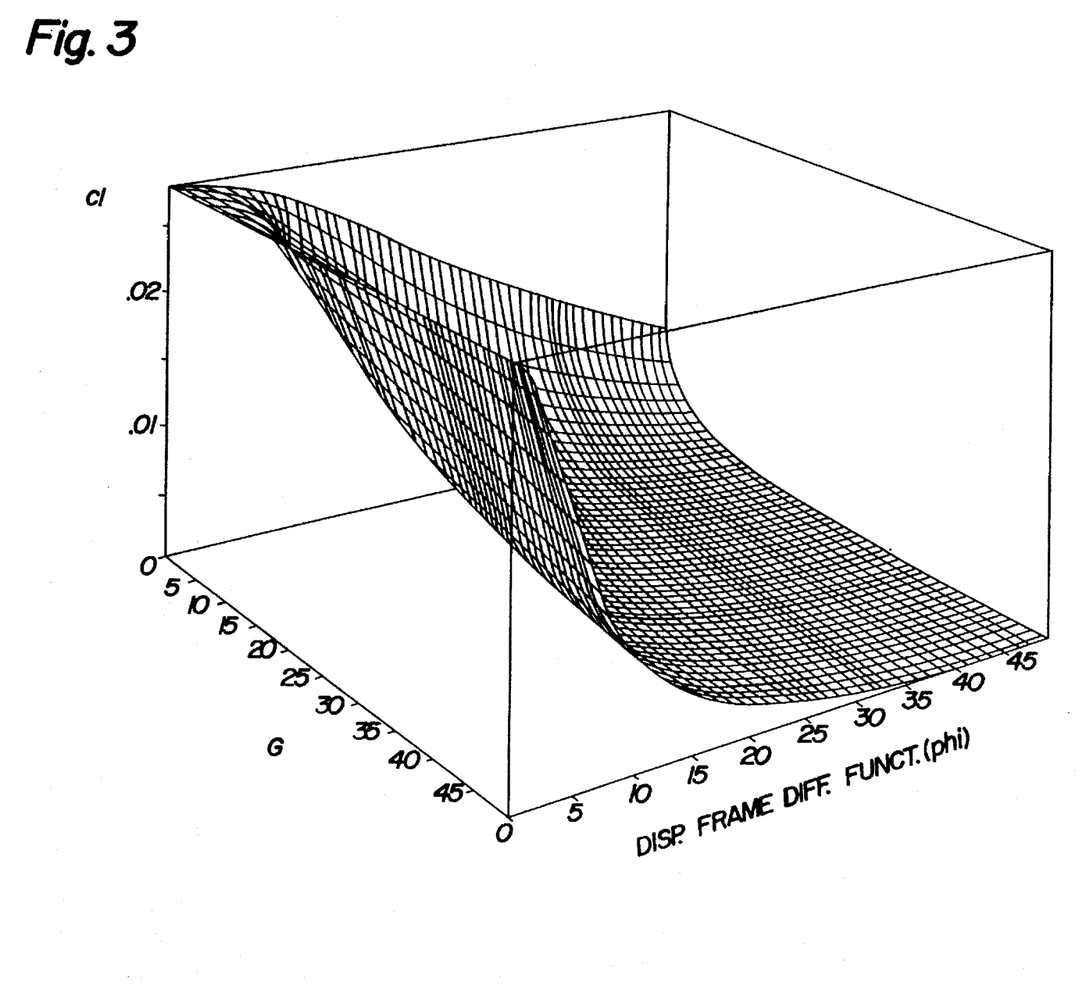
FIG. 3. illustrates a demonstration of the nature of $c_1(r,\hat{d}^\alpha)$ using a set of hypothetical G and $\phi^\alpha$ values: $c_1$ versus G and $\phi^\alpha$ for {u=6.0; p=0.4; and q=0.5}.
Figure 4A:
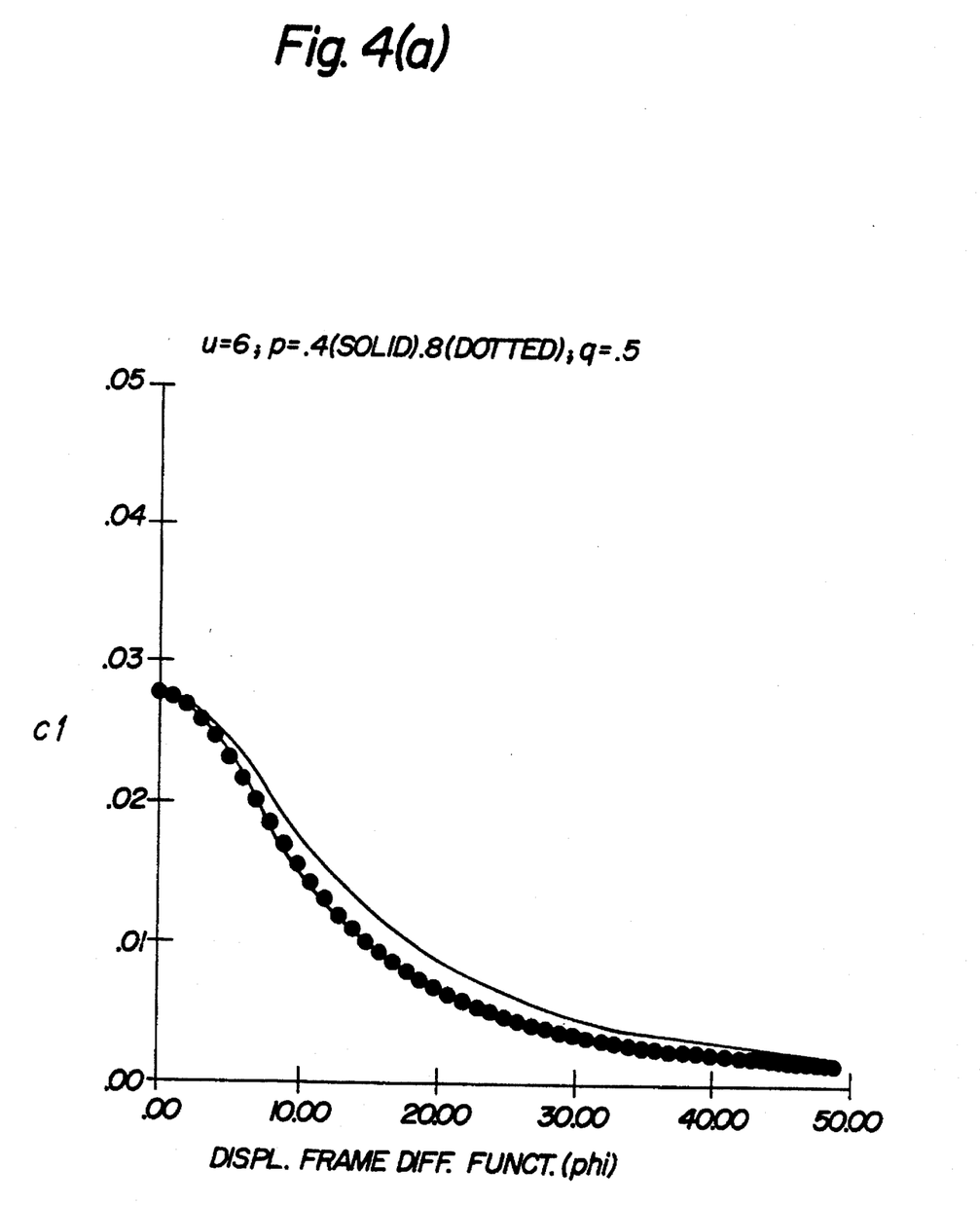
FIG. 4(a) shows a slice of the plot in FIG. 3 at a certain G value that is compared to curves obtained by individually varying the value of the parameter p: (u=6.0; p=0.4; and q=0.5) and (u=6.0; p=0.8; and q=0.5).
Figure 4B:
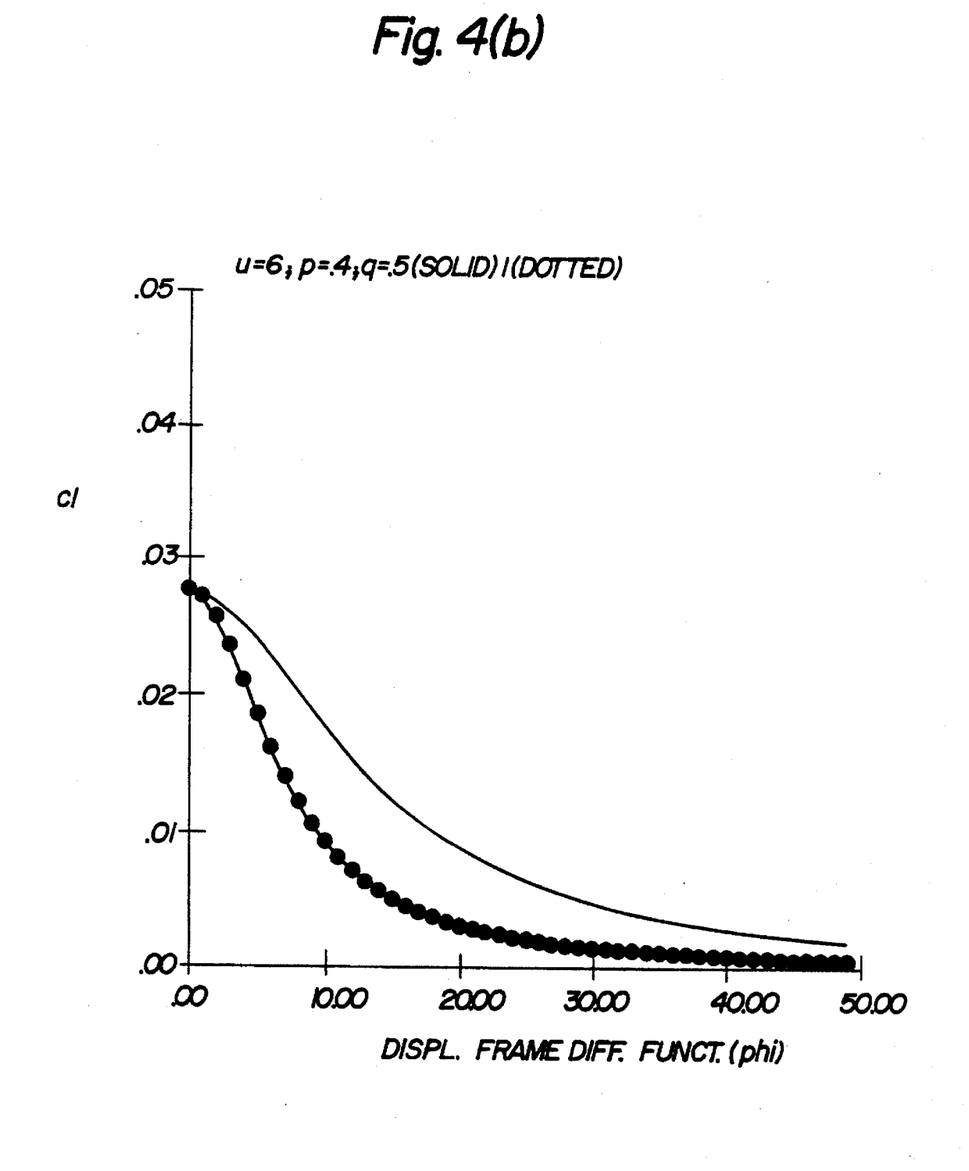
FIG. 4(b) shows a slice of the plot in FIG. 3 at a certain G value that is compared to curves obtained by individually varying the value of the parameter q: (u=6.0; p=0.4; and q=0.5) and (u=6.0; p=0.4; and q=1.0).
Figure 4C:
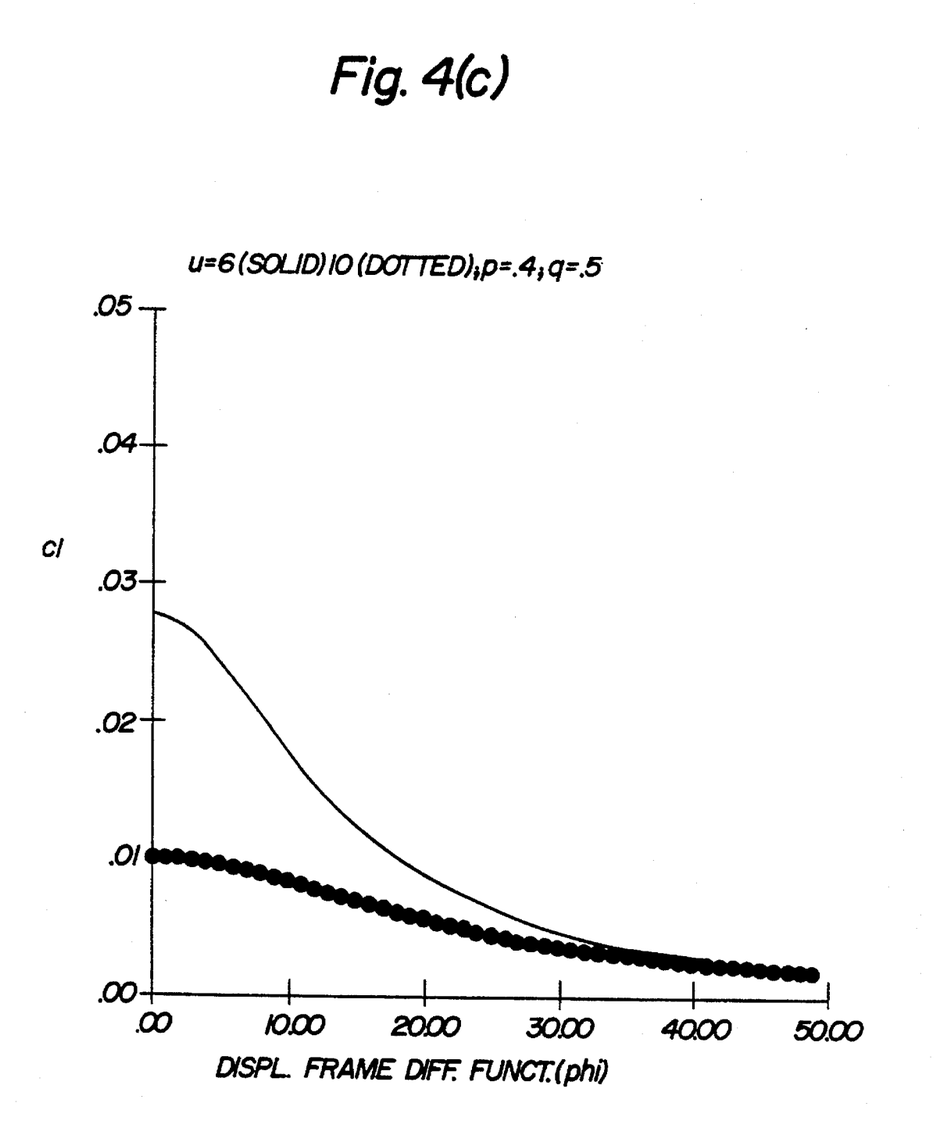
FIG. 4(c) shows a slice of the plot in FIG. 3 at a certain G value compared to curves obtained by individually varying the value of the parameter u: (u=6.0; p=0.4; and q=0.5) and (u=10.0; p=0.4; and q=0.5).
Figure 5:
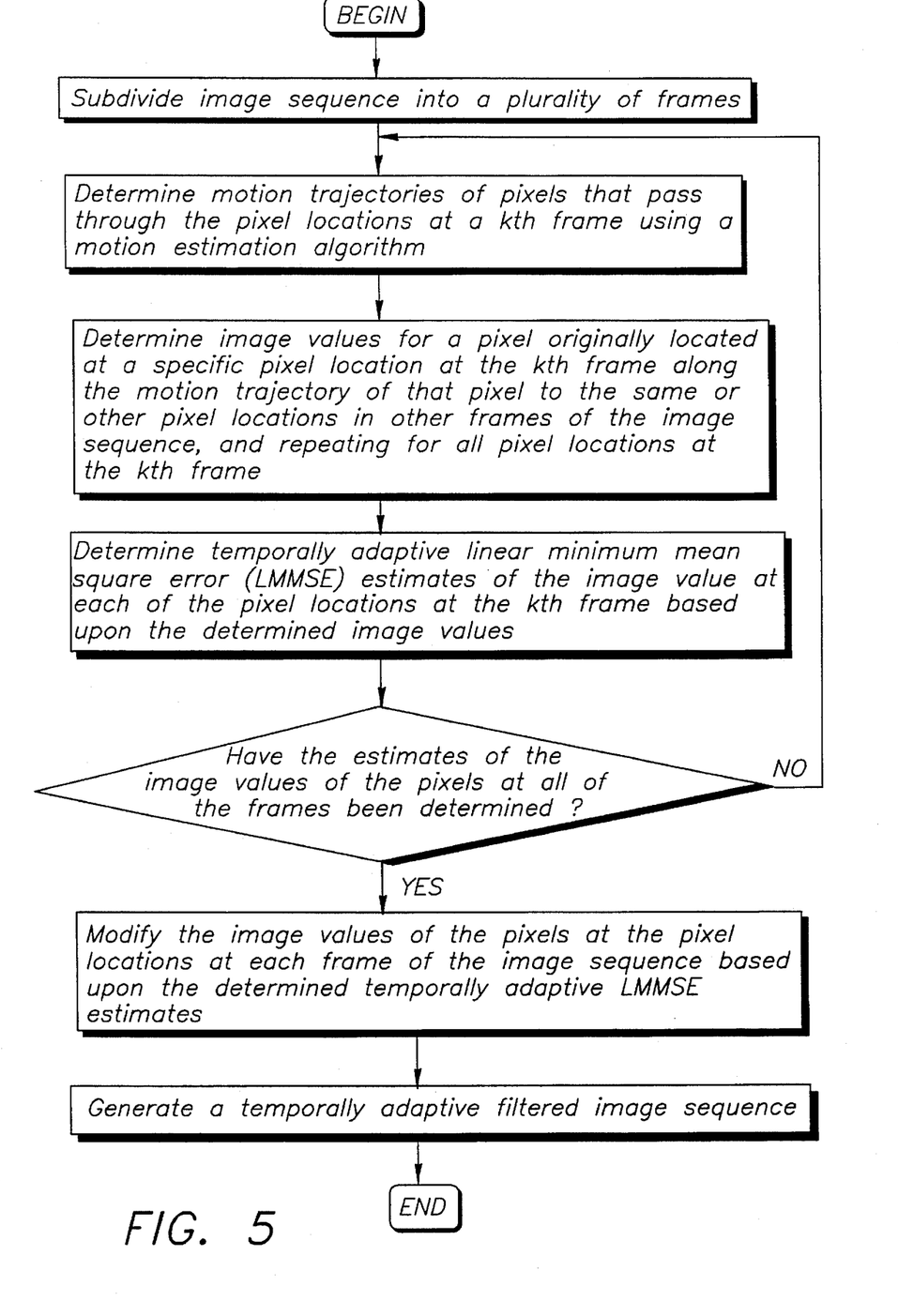
FIG. 5 shows a method for filtering a noisy image sequence according to an embodiment of the present invention.

More insight into the weight function can be gained by plotting its values against the displaced frame difference function and the displacement field gradient. FIG. 3 shows plots created by using an array of hypothetical $G(r,\hat{d}^\alpha)$ and $\phi^\alpha(r,\hat{d}^\alpha)$ values using {u=6.0; p=0.4; and q=0.5}. One can observe in FIG. 3 that the value of $c_1(r,\hat{d}^\alpha)$ decreases with increasing $\phi^\alpha$ values, and the rate of the decrease increases with increasing $G(r,\hat{d}^\alpha)$ values. The weight attains very small values when both of these quantities attain large values. A slice of the plot in FIG. 3 at a certain $G(r,\hat{d}^\alpha)$ value ($G(r,\hat{d}^\alpha)$=10) is compared in FIG. 4 to curves obtained by individually varying the values of the parameters p, q and u from that used in FIG. 3. The curves for (u=6.0; p=0.4; and q=0.5) and (u=6.0; p=0.8; and q=0.5) are compared in FIG. 4(a). FIGS. 4(b) and 4(c) compare the curves for (u=6.0; p=0.4; and q=0.5) and (u=6.0; p=0.4; and q=1.0), and (u=6.0; p=0.4; and q=0.5) and (u=10.0; p=0.4 and q=0.5), respectively.

The rate of the decrease of the weight function increases with increasing values of p and/or q. Larger values of u, in general, results in smaller values of the weight function (see FIG. 4(c)). It can be shown that the inflection point of the weight function occurs at $$\phi^\alpha(r,\hat{d}^\alpha) = \frac{u}{Vp^2 + q^2 G(r,\hat{d}^\alpha)},$$

for a fixed value of $G(r,\hat{d}^\alpha)$. The weight function $c_2(r,\hat{d}^\alpha)$ associated with the directional smoothness constraint is identical in form to the weight function $c_1(r,\hat{d}^\alpha)$. The roles played by $\nabla_s g^\alpha(r)$ and $\xi^\alpha(r,\hat{d}^\alpha,s)$ in $c_2(r,\hat{d}^\alpha,s)$ are similar to those played by $G(r,\hat{d}^\alpha)$ and $(\phi^\alpha(r,\hat{d}^\alpha))^2$ in $c_1(r,\hat{d}^\alpha)$, respectively.

When the value of the directional smoothness function $\xi^\alpha(r,\hat{d}^\alpha,s)$ increases at location r, the value of the weight function decreases, hence weakening the smoothness constraint at that location in the direction of s. Near occlusion boundaries, both $\xi^\alpha(r,\hat{d}^\alpha,s)$ and $\nabla_s g^\alpha(r)$ may attain high values when s is parallel to spatial gradient vector. In that case, due to the product term $z^2(\nabla_s g^\alpha(r))^2(\epsilon^\alpha(r,\hat{d}^\alpha,s))^2$ in the denominator of (9), the value of the weight significantly decreases, hence weakening the effect of the directional smoothness constraint on the solution of Eq.(7). The effect of the parameters v, w, and z on the value of $c_2$ is identical to the effects of the parameters u, p and q on the value of $c_1$. One can therefore refer to FIGS. 2 and 3 to gain an insight to the effects of these parameters on the weight function associated with the directional smoothness constraint.

The following is a discussion of multispectral extension. The advantage of using the different spectral channels of a given image sequence in intraframe motion estimation was pointed out above. Assume that the red (r), green (g) and blue (b) records of the image sequence data are available. Taking into account all three channels, the cost function in Eq.(7) becomes Eq. (10)

$$J(\hat{d}^\alpha,\delta\hat{d}^\alpha) = \int_\Omega [c_{1,r}(r,\hat{d}^\alpha) \, (\phi_r^\alpha(r,\hat{d}^\alpha+\delta\hat{d}^\alpha))^2 +$$

$$c_{1,g}(r,\hat{d}^\alpha) \, (\phi_g^\alpha(r,\hat{d}^\alpha+\delta\hat{d}^\alpha))^2 + c_{1,b}(r,\hat{d}^\alpha) \, (\phi_b^\alpha(r,\hat{d}^\alpha+\delta\hat{d}^\alpha))^2] dr +$$

$$\int_\Omega \left[ \int_s c_2(r,\hat{d}^\alpha,s) \, (\xi^\alpha(r,\hat{d}^\alpha+\delta\hat{d}^\alpha,s))^2 ds \right] dr$$

where the weight functions are given by Eq. (11)

$$c_{1,j}(r,\hat{d}^\alpha) =$$

$$\frac{1}{u^2 + p^2(\phi_j^\alpha(r,\hat{d}^\alpha))^2 + q^2(\|\nabla\hat{d}_x^\alpha(r)\|^2 + \|\nabla\hat{d}_y^\alpha(r)\|^2)(\phi_j^\alpha(r,\hat{d}^\alpha))^2}$$

$(j = r,g,b)$, and

Eq. (12)

$$\tilde{c}_2(r,\hat{d}^\alpha,s) =$$

$$\frac{1}{v^2 + w^2(\xi^\alpha(r,\hat{d}^\alpha,s))^2 + z^2[\nabla_s g_r^\alpha(r) + \nabla_s g_g^\alpha(r) + \nabla_s g_b^\alpha(r)]^2(\xi^\alpha(r,\hat{d}^\alpha,s))^2}$$

The solution of the variational principle can be obtained via calculus of variations, which in this case provides the necessary condition that the solution should satisfy:

$$\left.\frac{\partial J}{\partial \delta\hat{d}_x^\alpha}\right|_{\delta\hat{d}_x^\alpha=0} = 0 \text{ and } \left.\frac{\partial J}{\partial \delta\hat{d}_y^\alpha}\right|_{\delta\hat{d}_y^\alpha=0} = 0$$

These conditions give rise to a nonlinear equation which is then solved at each resolution level using a Quasi-Newton method. The estimate obtained at one resolution level is used as the initial estimate for the next higher resolution level.

The temporally adaptive LMMSE filtering performed by the present invention will now be described. The filter structure used in the present invention to perform temporal filtering has been originally derived by Kuan, et al. and Lee (discussed earlier) in the spatial domain for removing noise from still imagery. Kuan, et al. and Lee used different sets of assumptions in their derivations. The assumptions used by Kuan, et al. are considered for now because they are more appropriate for the present applications than are Lee. For instance, unlike the one given by Lee, the derivation provided by Kuan, et al. allows for signal-dependent noise. This is important in the case of processing sequences digitized from a motion picture film, where the noise is signal-dependent due to the present of film grain.

Kuan, et al. addresses the problem of finding an LMMSE estimate of the original signal from its noisy observation $g(m,n)=f(m,n)+v(m,n)$ (i.e., the filtering problem) where the noise can be signal-dependent or signal-independent. The signal-dependent noise can in general be modeled as $v(m,n)=\gamma(m,n)f^\alpha(m,n)$ where $\gamma(m,n)$ is wide sense stationary with zero-mean and unity variance, and independent of the image signal. The parameter $\alpha$ is a real number; the film grain noise can be modeled with $\alpha=\frac{1}{3}$. It is assumed that (i) the image has a nonstationary mean, denoted by $\mu_f(m,n)$, and the residual $\rho(m,n)=f(m,n)-\mu_f(m,n)$ is a white process with nonstationary variance $\sigma_f(m,n)$ (this is referred to as the "nonstationary mean nonstationary variance image model"); and (ii) the noise is a zero-mean white process. In Kuan et al., the nonstationary mean nonstationary variance model is experimentally verified in the case of real-life images using local statistics. It is observed that the residual signal appears like white noise, especially in uniform image regions.

The LMMSE estimate $\hat{f}(m,n)$ has the following form: Eq. (13)

$$\hat{f}(m,n) = \frac{\sigma_f^2(m,n)}{\sigma_f^2(m,n) + \sigma_v^2(m,n)} [g(m,n) - \mu_f(m,n)] + \mu_f(m,n)$$

where $\sigma_v^2(m,n)$ denotes the noise variance. If the ensemble statistics are replaced by local statistics (on the basis of local ergodicity assumption) computed from the observed image, we have the local LMMSE estimate: (Eq. 14)

$$\hat{f}(m,n) = \frac{\hat{\sigma}_f^2(m,n)}{\hat{\sigma}_f^2(m,n) + \hat{\sigma}_v^2(m,n)} [g(m,n) - \hat{\mu}_f(m,n)] + \hat{\mu}_f(m,n)$$

(The "$\hat{}$" notation denote the local statistics.) If we denote the sample variance and sample mean of $g(m,n)$ computed over a local region centered at $(m,n)$ by $\hat{\sigma}_g^2(m,n)$ and $\hat{\mu}_g(m,n)$, respectively, then $\hat{\sigma}_f^2(m,n)=\max[0,\hat{\sigma}_g^2(m,n)-\hat{\sigma}_v^2(m,n)]$ and $\hat{\mu}_f(m,n)=\hat{\mu}_g(m,n)$, where $\hat{\sigma}_v^2(m,n)$ denotes the sample variance of the noise process. Note that due to the nonlinearity inherent to computing sample variances, the local LMMSE estimate becomes a nonlinear estimate.

In the method of the present invention, the spatially local LMMSE filter structure of Eq. (14) is used in the temporal domain along motion trajectories. Replacing the spatial local statistics with their temporal counterparts, the temporally local LMMSE estimate of the image value at location (m,n) of the frame at time k is given by Eq. (15)

$$\hat{f}(m,n,k) =$$

$$\frac{\hat{\sigma}_f^2(m,n;k)}{\hat{\sigma}_f^2(m,n;k) + \hat{\sigma}_v^2(m,n;k)} [g(m,n,k) - \hat{\mu}_f(m,n;k)] + \hat{\mu}_f(m,n;k).$$

where $\hat{\sigma}_f^2(m,n;k)=\max[0,\hat{\sigma}_g^2(m,n;k)-\hat{\sigma}_v^2(m,n;k)]$. The quantities $\hat{\sigma}_g^2(m,n;k)$ and $\hat{\mu}_f(m,n;k)=\hat{\mu}_g(m,n;k)$ denote the sample variance and mean of the degraded image sequence, respectively, computed over the motion trajectory $\tau_{m,n,k}$. This applies for the case of filtering the pixel at location $(m,n)=a$ in the $k=0$ th frame. The noisy pixel value is denoted by $g(a,0)$. In FIG. 6, the trajectory of interest is $\tau_{a,0}=\{a,b,c,d,e\}$. The variance $\sigma_f(a,0)$ and the mean $\mu_f(a,0)$ are estimated from the sample mean and sample variance of the values $g(c,-2), g(b,-1), g(a,0), g(d,1), g(e,2)$. The estimate of $g(a,0)$ is denoted by $\hat{f}(a,0)$. Note that the "white residual assumption" is appropriate along motion trajectories on which the signal statistics resemble the signal statistics over a uniform spatial region, especially at points where a good estimate of the displacement field is obtained.

One should observe that the LMMSE estimator of the present invention defined in Eq.(15) satisfies the adaptivity requirement outlined earlier. If the displacement estimates used to determine the motion trajectory are accurate, then the temporal signal variance decreases and the estimation approaches direct averaging. As the accuracy of displacement estimation decreases, the estimator deviates from direct averaging, and in the extreme when the temporal signal variance is much larger than the noise variance, the estimate approaches to the noisy value.

In practice, the noise variance may not be known a priori. In that case, an estimate of the noise variance can be obtained from the sample variance of pixel values at a uniform region of the kth frame. This assumes that the noise is locally ergodic in both space and time and have identical second order statistics.

Figure 2:
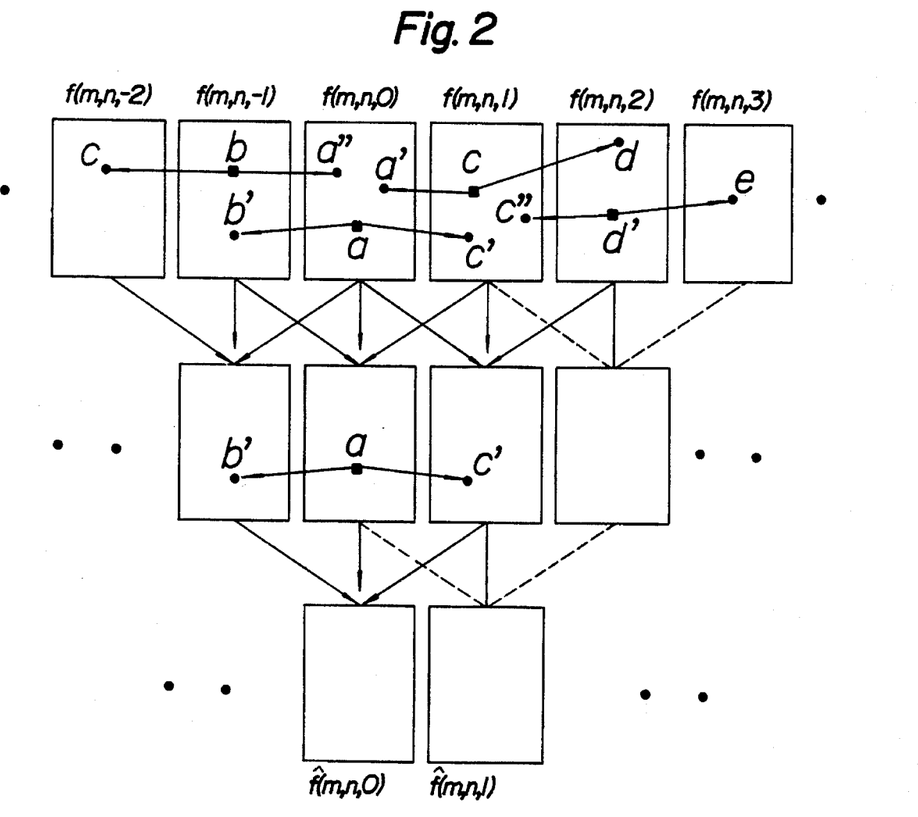
FIG. 2 shows a sequence of image frames to illustrate another embodiment of the method of the present invention.

Two different embodiments of the method of the present invention are illustrated by FIGS. 1 and 2, where $N=5$ and frames at $k=-2,-1,0,1,2$ are used to filter the frame at $k=0$, denoted by $f(m,n,0)$. In the embodiment of the method depicted in FIG. 1, the displacement vectors from frame $f(m,n,0)$ to the others are estimated. The pixel at location a in $f(m,n,0)$ is displaced to (possibly) subpixel locations c,b,d,e in $f(m,n,-2), f(m,n,-1), f(m,n,1), f(m,n,2)$, respectively. For the pixel located at a, the trajectory $\tau_a=\{a,b,c,d,e\}$ is used in LMMSE filtering. Clearly, if N is large and there is significant interframe motion (and hence occlusion), the precision of motion estimation is likely to decrease in this embodiment of the method. In the ideal case of perfect displacement estimation and in the presence of signal-independent noise, this method reduces the noise variance by a factor of N.

Another embodiment of the present invention, depicted in FIG. 2, is more precise as far as the estimation of motion trajectories is concerned. In this case, the displacement vectors from one frame to its two neighboring frames are estimated. The filtering is done in $M=(N-1)/2=2$ steps. In the first step, the frames $[f(m,n,-2), f(m,n,-1), f(m,n,0)]; [f(m,n,-1), f(m,n,0), f(m,n,1)]$; and $[f(m,n,0), f(m,n,1), f(m,n,2)]$ are filtered using trajectories $\tau_b=\{c,b,a''\}, \tau_a=\{b',a,c'\}$ and $\tau_c=\{a',c,d\}$, respectively, to produce the three intermediate frames. In the last step, these three frames are filtered using the trajectory $\tau_a=\{b',a,c'\}$ to determine the estimate $\hat{f}(m,n,0)$.

In the second described embodiment, filtering of a certain frame using $N=2M+1$ frames is performed in M steps, and the LMMSE estimation is applied to groups of three frames. The process can be efficiently carried out for the other frames of the sequence. For instance, in filtering $f(m,n,1)$, only one LMMSE estimation needs to be performed at the first step since the other two intermediate frames required at the second step have already been formed during filtering the previous frame $f(m,n,0)$.

It can be verified that, in the ideal case of perfect displacement estimation, where $b=b', a=a'=a''$ and $c=c'$, and in the presence of signal-independent noise, the second embodiment of the present invention reduces the noise variance by a factor of $F=3(M+1)^3/2M(M+2)+3$ (e.g., $F=81/19=4.3$ for $N=5$). Finally, note that these two implementations are identical for $N=3$.

Modifications of the method of the present invention are possible without departure from the scope and spirit of the invention. Methods other than the above-discussed LMMSE filtering, such as median filtering, can be used along the motion trajectories to perform temporal noise filtering. In fact, almost all of the known "edge-preserving" spatial filtering techniques can be extended by one of ordinary skill in the art to motion-compensated temporal filtering. (The specifics of edge-preserving spatial filtering techniques will not be discussed in detail here, as they are well known.) The edge-preserving property of a spatial filter enables the corresponding motion-compensated temporal filter to meet the adaptivity requirement stated earlier, i.e., that less smoothing should be performed along motion trajectories when the displacement vector estimate is inaccurate in order to prevent smearing artifacts to occur.

The LMMSE filter structure of the present invention given in Eq.(15) can be modified to improve noise reduction in cases where the scene content changes abruptly from one frame to another. Consider for instance the implementation given in FIG. 2. In the first step, the filter structure is applied to frames $f(m,n,-2), f(m,n,-1)$ and $f(m,n,0)$ to produce an intermediate frame. Suppose that the frames $f(m,n,-2), f(m,n,-1)$ contain an indoor scene, but the following frames contain an outdoor scene which is substantially different than the indoor scene. In this case, the displacement field estimate from $f(m,n,-1)$ to $f(m,n,-2)$ is expected to be more accurate than the estimate from $f(m,n,-1)$ to $f(m,n,0)$. Therefore, it may be advantageous to replace the sample mean $\hat{\mu}_f$ in Eq.(15) by a weighted sample mean which puts more emphasis on image values at locations of frames at times $k=-2$ and $k=-1$ whose displacement estimates are more accurate, and less emphasis to the corresponding image value of the frame at time $k=0$. Generally speaking, the weighted sample mean should take into account the accuracy of intraframe motion estimation by assigning larger weights to image values whose displacement estimates are more accurate. (It should be noted that the filter structure obtained by replacing $\hat{\mu}_f$ by a weighted mean is indeed not optimum in the minimum mean square error sense.)

A "motion adaptive" weighted sample mean can be defined mathematically as follows: Suppose, for simplicity, that $M=1$, i.e., the frames at times $k-1, k$, and $k+1$ are used to filter the frame at time k. Then, the weighted sample mean along the motion trajectory $\tau_{m,n,k}$ passing through the pixel location $(m,n)$ in the kth frame, denoted by $\hat{\mu}_f^a(m,n;k)$, is the minimizer of the functional Eq. (16)

$$I(X) = \sum_{\substack{l=k-1 \\ (i,j) \in \tau_{m,m,k}}}^{k+1} \frac{(X - q(i,j,l))^2}{1 + p^2(\max[\epsilon^2, (g(m,n,k) - g(i,j,l))^2])}$$

at $X=\hat{\mu}_f^a(m,n;k)$. Quantities a ($a>0$) and $\epsilon$ are fixed parameters; we shall describe later how they effect the weighted mean value. Differentiating $I(X)$ with respect to X and setting the result equal to zero, we obtain Eq. (17)

$$\hat{\mu}_f^a(m,n;k) = \sum_{\substack{l=k-1 \\ (i,j) \in \tau_{m,n,k}}}^{k+1} w(i,j,l) g(i,j,l),$$

where the weight function is given by $$w(i,j,l) = K(1+p^2\max[\epsilon^2, (g(m,n,k)-g(i,j,l))^2])^{-1}, \quad \text{Eq. (18)}$$

and the constant K is defined as $$K = \beta(i,j,k-1)\beta(i,j,k)\beta(i,j,k+1)/[\beta(i,j,k-1)\beta(i,j,k)+\beta(i,j,k-1)\beta(i,j,k+1)+\beta(i,j,k)\beta(i,j,k+1)] \quad \text{Eq. (19)}$$

The quantity $\beta(i,j,l)$ denotes the denominator term in Eq. (16), i.e., $\beta(i,j,l) = 1 + a^2(\max[\epsilon^2, (g(m,n,k)-g(i,j,l))^2])$.

The resulting weighted mean will now be analyzed, with several remarks being in order. The weight associated with the value $g(m,n,k)$ of the center frame is fixed: $w(m,n,k) = K/(1+p^2\epsilon^2)$. Hence the contribution of the central value $g(m,n,k)$ to the weighted mean is always the same. If the difference between the corresponding values $g(m,n,k)$ and $g(i,j,k-1)$ (or $g(m,n,k)$ and $g(i,j,k+1)$) is large (larger than $\epsilon^2$) then the contribution of $g(i,j,k-1)$ (or $g(i,j,k+1)$) to the weighted mean is small. The parameter a determines the sensitivity of the weight value to the difference terms $(g(m,n,k)-g(i,j,k-1))^2$ and $(g(m,n,k)-g(i,j,k+1))^2$. When the differences between the corresponding values are merely due to the noise, it is desirable that the weighted averaging reduces to direct averaging It is therefore plausible to set $\epsilon^2$ equal to twice the estimate noise variance. In that case, when $(g(m,n,k)-g(i,j,k-1))^2$ and $(g(m,n,k)-g(i,j,k+1))^2$ are both less than $\epsilon^2$, the weights attain the value $K/(1+p^2\epsilon^2)$ and $\hat{\mu}_f^a(m,n,k)$ reduces to direct averaging, i.e., $\hat{\mu}_f^a(m,n,k) = \hat{\mu}_f(m,n;k)$.

In an embodiment of the present invention, the motion-adaptive mean value is used as the filtered pixel value in filtering the image sequences. In other words, the filter is defined as $\hat{f}(m,n,k) = \hat{\mu}_f^a(m,n,k)$.

The various embodiments of the method of the present invention as described above can be implemented using conventional physical image processing equipment, such as a camera, an image digitizer, a computer, and a display, and as such, are not shown in detail in order not to obscure the present invention Although the invention has been described and illustrated in detail, it is to be clearly understood that the same is by way of illustration and example, and is not to be taken by way of limitation The spirit and scope of the present invention are to be limited only by the terms of the appended claims

What is claimed is:

1. A method of temporally adaptive filtering frames of an image sequence in which each image of the sequence has pixel locations, comprising:

(a) subdividing an image sequence into a plurality of frames;

(b) determining motion trajectories of pixels that pass through the pixel locations at a kth frame using a motion estimation algorithm;

(c) determining image values for a pixel originally located at a specific pixel location at the kth frame along the motion trajector of that pixel to the same or other pixel locations in other frames of the image sequence, and repeating for all pixel locations at the kth frame;

(d) determining temporally adaptive linear minimum mean square error (LMMSE) estimates of the image value at each of the pixel locations at the kth frame based upon the determined image values;

(e) repeating steps b, c and d for each of the other frames of the image sequence;

(f) modifying the image values of the pixels at the pixel locations at each frame of the image sequence based upon the determined temporally adaptive LMMSE estimates; and (g) generating a temporally adaptive filtered image sequence.

2. The method of claim 1, wherein, for a pixel located at (m,n) in the kth frame, the motion trajectory $\tau_{m,n,k}$ is defined as a set of locations containing (m,n) as well as displaced locations corresponding to (m,n) in N-1 neighboring frames at times k-M, ... k-1, k+1, ..., k+M, where N=2M+1.

3. The method of claim 1, wherein step (b) further comprises estimating displacement vectors with the motion estimation algorithm.

4. The method of claim 3, wherein components of the displacement vector estimates are real-valued, such that the motion trajectories include subpixel locations, and wherein step (c) further comprises (f) determining image values at the subpixel locations by interpolation.

5. The method of claim 1, wherein the motion estimation algorithm is a spatiotemporal-gradient method.

6. The method of claim 5, wherein the spatiotemporal-gradient method is the Fogel algorithm.

7. The method of claim 1, wherein step (b) includes the steps of:

(b) (1) forming a multiresolution representation of the image sequence;

(b) (2) constraining a displacement vector field estimate using optical flow and directional smoothness constraints;

(b) (3) obtaining a displacement vector field estimate using a variational principle; and (b) (4) solving the variational principle.

8. The method of claim 1, wherein the temporally local LMMSE estimate of the image value at pixel location (m,n) of the kth frame is determined according to the equation:

$$\hat{f}(m,n,k) = \frac{\hat{\sigma}_f^2(m,n;k)}{\hat{\sigma}_f^2(m,n;k)+\hat{\sigma}_v^2(m,n;k)}[g(m,n,k)-\hat{\mu}_f(m,n;k)]+\hat{\mu}_f(m,n;k).$$

where $\hat{\sigma}_f^2(m,n;k) = \max[0,\hat{\sigma}_g^2(m,n;k)-\hat{\sigma}_v^2(m,n;k)]$, and $\hat{\sigma}_g^2(m,n;k)$ is the sample variance, and $\hat{\mu}_f(m,n;k) = \hat{\mu}_g(m,n;k)$ is the sample mean of a degraded image sequence computed over the motion trajectory $\tau_{m,n,k}$, and $\hat{\sigma}_v^2(m,n)$ denotes the sample variance of a noise process.

9. The method of claim 1, wherein step (b) includes estimating the motion trajectories from the kth frame to a predetermined number of contiguous frames in the image sequence.

10. The method of claim 9, wherein the predetermined number of contiguous frames are used to filter the kth frame.

11. The method of claim 1, wherein step (b) includes estimating the motion trajectories from the kth frame to a k-1 frame and a k+1 frame.

12. The method of claim 11, wherein the k-1, k and k+1 frames are filtered to produce three intermediate frames, these intermediate frames then being filtered to determine an estimate $\hat{f}(m,n,k)$ of the image value in step (d).

13. The method of claim 1, wherein the kth frame is filtered using N=2M+1 frames, the filtering being performed in M steps, and the LMMSE estimation is applied to groups of three frames where N is a predetermined number of frames.

14. The method of claim 1, wherein the temporally local LMMSE estimate of the image value at pixel location (m,n) of the kth frame is determined according to the equation:

$$\hat{f}(m,n,k) =$$

$$\frac{\hat{\sigma}_f^2(m,n;k)}{\hat{\sigma}_f^2(m,n;k) + \hat{\sigma}_v^2(m,n;k)} [g(m,n,k) - \hat{\mu}_f^a(m,n;k)] + \hat{\mu}_f^a(m,n;k).$$

where $\hat{\sigma}_f^2(m,n;k) = \max[0, \hat{\sigma}_g^2(m,n;k) - \hat{\sigma}_v^2(m,n;k)]$, and $\sigma_g^2(m,n;k)$ is the sample variance, and $\hat{\mu}_f^a(m,n;k) =$ $$\sum_{\substack{l=k-1 \\ (i,j) \tau_{m,n,k}}}^{k+1} w(i,j,l) g(i,j,l),$$

is a motion-adaptive sample mean where the weight function is given by $$w(i,j,l) = K(1 + a^2 \max[\epsilon^2, (g(m,n,k) - g(i,j,l))^2])^{-1},$$

and the constant K is defined as $$K = \beta(i,j,k-1)\beta(i,j,k)\beta(i,j,k+1)/[\beta(i,j,k-1)\beta(i,j,k) + \beta(i,j,k-1)\beta(i,j,k+1) + \beta(i,j,k)\beta(i,j,k+1)]$$

the quantity β being given by, $$\beta(i,j,l) = 1 + a^2(\max[\epsilon^2, (g(m,n,k) - g(i,j,l))^2]).$$

15. The method of claim 1, wherein the temporally local LMMSE estimate of the image value at pixel location (m,n) of the kth frame is determined according to the equation $\hat{f}(m,n,k) = \hat{\mu}_f^a(m,n,k)$ where $\hat{\mu}_f^a(m,n,k)$ is a motion-adaptive sample mean value and $\hat{f}(m,n,k)$ is a filtered pixel value.

16. A method of temporally adaptively filtering frames of an image sequence in which each image of the sequence has pixel locations, comprising:

(a) subdividing an image sequence into a plurality of frames;

(b) determining motion trajectories of pixels that pass through the pixel locations at a kth frame using a motion estimation algorithm;

(c) determining image values for a pixel originally located at a specific pixel location at the kth frame along the motion trajectory of that pixel to the same or other pixel locations in other frames of the image sequence, and repeating for all pixel locations at the kth frame;

(d) determining temporally adaptive estimates of image value at each of the pixel locations at the kth frame based upon the determined image values;

(e) repeating steps b, c and d for each of the other frames of the image sequence;

(f) modifying the image values of the pixels at the pixel locations at each frame of the image sequence based upon the determined temporally adaptive LMMSE estimates; and (g) generating a temporally adaptive filtered image sequence.

17. The method of claim 16, wherein step (d) includes median filtering along the motion trajectories to perform temporal noise filtering.

18. The method of claim 16, wherein step (d) includes edge-preserving spatial filtering.

* * * * *